US008872436B2

(12) United States Patent
Kim et al.

(10) Patent No.: US 8,872,436 B2
(45) Date of Patent: Oct. 28, 2014

(54) POWER SUPPLY DEVICE FOR CHARGE PUMPING

(75) Inventors: Joung Yeal Kim, Yongin-Si (KR); Su Jin Park, Hwaseong-Si (KR); Young Hyun Jun, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 221 days.

(21) Appl. No.: 13/615,843

(22) Filed: Sep. 14, 2012

(65) Prior Publication Data
US 2013/0162159 A1 Jun. 27, 2013

(30) Foreign Application Priority Data
Dec. 26, 2011 (KR) .................. 10-2011-0141911

(51) Int. Cl.
*G05F 1/10* (2006.01)
*H05B 37/02* (2006.01)

(52) U.S. Cl.
USPC .......................................... 315/210; 327/536

(58) Field of Classification Search
USPC ............ 315/210; 362/97.1; 323/282; 327/536
See application file for complete search history.

(56) References Cited

U.S. PATENT DOCUMENTS

| 6,026,003 | A | 2/2000 | Moore et al. |
| 6,831,499 | B2 | 12/2004 | Oddone et al. |
| 7,724,073 | B2 * | 5/2010 | Kim et al. ................ 327/536 |
| 7,928,795 | B2 * | 4/2011 | Kim et al. ................ 327/536 |
| 8,130,028 | B2 * | 3/2012 | Park et al. ................ 327/536 |
| 2009/0134937 | A1 * | 5/2009 | Kim et al. ................ 327/536 |
| 2010/0026373 | A1 * | 2/2010 | Kim et al. ................ 327/536 |
| 2010/0207684 | A1 * | 8/2010 | Park et al. ................ 327/536 |

FOREIGN PATENT DOCUMENTS

| JP | 2002058237 A | 2/2002 |
| KR | 20050044927 A | 5/2005 |
| KR | 10-0986099 | 10/2010 |

OTHER PUBLICATIONS

Park et al., "CMOS cross-coupled charge pump with improved latch-up immunity," IEICE Electronics Express, vol. 6, No. xx, 1-7.
Lee et al., "Switching Noise and Shoot-through Current Reduction Techniques for Switched-Capacitor Voltage Doubler," IEEE Journal of Solid-State Circuits, vol. 40, No. 5, May 2005, pp. 1136-1146.
Min et al., "A Large-Current-Output Boosted Voltage Generation with Non-Overlapping Clock Control for Sub-1-V Memory Applications," 2004 IEEE, pp. 288-291.
"A new latch-up free CMOS Charge Pump for no reversion loss and enlarged output drivability".

* cited by examiner

*Primary Examiner* — Daniel D Chang
(74) *Attorney, Agent, or Firm* — Volentine & Whitt, PLLC

(57) ABSTRACT

A power supply device includes; first/second boost circuits that boost voltages applied to a first/second boost nodes in response to a first/second main signals, and respectively operated first/second transmission unit that control provision of boosted voltages to an output node. The power supply device also includes a bulk voltage controller connected between the boosted nodes and controlling a connection between the output node and a bulk node in response to a bulk control signal. Voltages respectively applied to the first and second transmission units are determined in response to an output node voltage, as well as the first/second main signals.

20 Claims, 19 Drawing Sheets

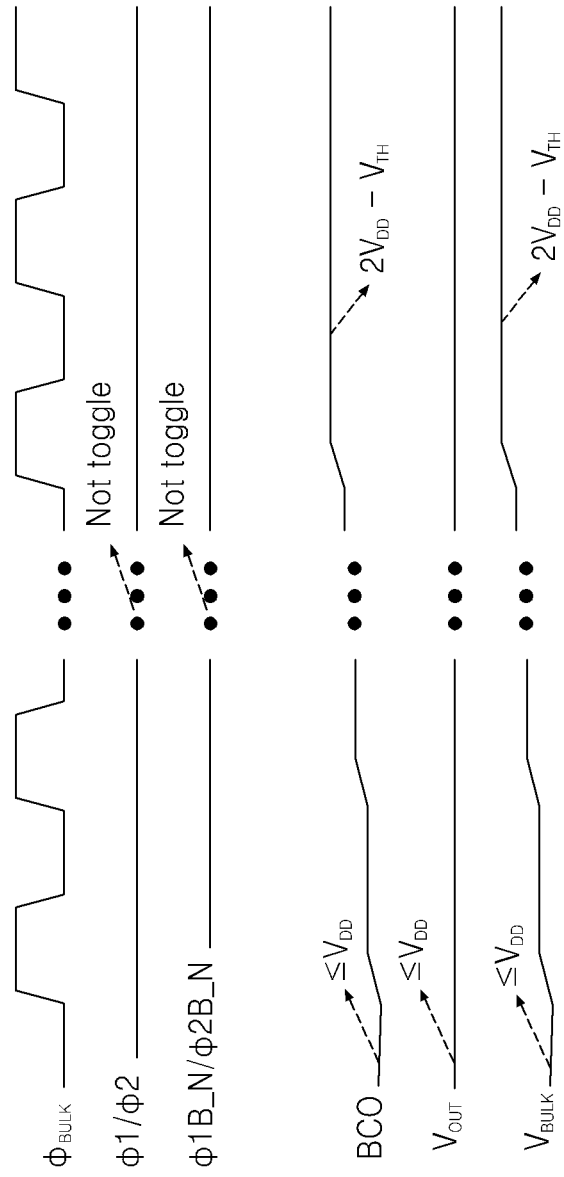

POWER SUPPLY DEVICE FOR CHARGE PUMPING

CROSS-REFERENCE TO RELATED APPLICATIONS

This application claims the benefit of Korean Patent Application No. 10-2011-0141911 filed Dec. 26, 2011, the subject matter of which is hereby incorporated by reference.

BACKGROUND

One or more aspects of the inventive concept relate to power supply devices that may be used to perform charge pumping in electrical circuits. More particularly, the inventive concept relates to power supply devices capable of performing charge pumping while also preventing a latch-up phenomenon in order to stably supply an output voltage.

In general operation, a direct current (DC) voltage supply converts an alternating current (AC) voltage into a direct current (DC) voltage that may then be used to in an electronic device. One common type of DC voltage supply is the switching mode power supply (SMPS). The SMPS is highly efficient and relatively small-sized and light weight.

A DC voltage provided by the SMPS may be variously applied to system components and circuits within an electronic device. The SMPS is required to provide one or more DC voltages (e.g., 5 V, 3.3 V, and/or 12 V) within the electronic device. Accordingly, a charge pump may be incorporated to receive a (base) DC voltage from the SMPS, boost the DC voltage to an appropriate level, and then provided the boosted-level DC voltage to some circuit or component (e.g., a chip set or memory) in the electronic device.

In this regard, a Complementary Metal Oxide Semiconductor (CMOS) charge pump receives a clock signal (or phase signal) as a reference signal during operation, boosts a DC voltage using a capacitor and in response to reference signal, and then provides the boosted voltage to an output terminal via a transfer switch. Current consumption may occur via the output terminal when to an external load is connected. As the current consumption increases, the boosted voltage apparent at the output terminal may not be constantly maintained. Thus, the CMOS charge pump should be designed to supply a constant, boosted voltage regardless of current consumption at a connected output terminal.

The CMOS charge pump may use an NMOS transistor or a PMOS transistor as a transfer switch. In an NMOS type charge pump, electrical charge is only delivered at high speeds from an input direction to an output direction, but the voltage provided to the output terminal is reduced by a threshold voltage Vth of the NMOS transistor, thereby reducing output efficiency.

In contrast, a PMOS type charge pump is capable of delivering a boosted voltage to an output terminal without a threshold voltage drop. From among various PMOS type charge pumps, the so-called cross-coupled charge pump finds use in many applications. In a cross-coupled charge pump, a bulk node and an output node of a PMOS transistor are directly connected to each other, and therefore, any change in the output voltage will be mirrored by a resulting change in a bulk voltage. Thus, when leakage current flows through a bulk node of a device having a CMOS structure not only is power loss, but also a certain latch-up phenomenon may occur, thereby impairing the overall reliability of the electronic device incorporating the DC power supply.

SUMMARY

According to an aspect of the inventive concept, there is provided a power supply device, comprising; a boost circuit unit that boosts voltages of a first boost node and a second boost node in response to a first main signal and a second main signal, respectively, an output unit including a first transmission unit and a second transmission unit that provides a boosted voltage via an output node, wherein the first transmission unit applies the voltage of the first boost node to the output node and the second transmission unit applies the voltage of the second boost node to the output node, and a bulk voltage controller, connected between the first boost node and the second boost node, that controls a connection between the output node and a bulk node in response to a bulk control signal, wherein first and second voltages respectively applied to gates of the first transmission unit and the second transmission unit are determined according to a voltage apparent at the output node, the first main signal and the second main signal.

According to another aspect of the inventive concept, there is provided a power supply device, comprising; a first boost circuit that boosts a voltage applied of a first boost node in response to a first main signal, and a first transmission unit having a first PMOS transistor receiving a first gate voltage that controls provision of the boosted voltage of the first boost node to an output node, a second boost circuit that boosts a voltage applied to a second boost node in response to a second main signal, and a second transmission unit having a second PMOS transistor receiving a second gate voltage that controls provision of the boosted voltage of the second boost node to the output node, and a bulk voltage controller, connected between the first boosted node and the second boosted node, that controls a connection between the output node and a bulk node in response to a bulk control signal, wherein voltages respectively applied to gates of the first and second PMOS transistors are determined in response to an output voltage at the output node, the first main signal, and the second main signal.

BRIEF DESCRIPTION OF THE DRAWINGS

Exemplary embodiments of the inventive concept will be more clearly understood from the following detailed description taken in conjunction with the accompanying drawings in which:

FIGS. 7A to 7C are timing diagrams illustrating charge pumping performed by a power supply device, according to an embodiment of the inventive concept;

DETAILED DESCRIPTION

Embodiments of the inventive concept now will be described in some additional detail with reference to the accompanying drawings. The invention may, however, be embodied in many different forms and should not be construed as being limited to only the illustrated embodiments. Rather, these embodiments are provided so that this disclosure will be thorough and complete, and will fully convey the scope of the invention to those skilled in the art. Throughput the written description and drawings, like numbers and labels are used to denote lie or similar elements and features.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 2:
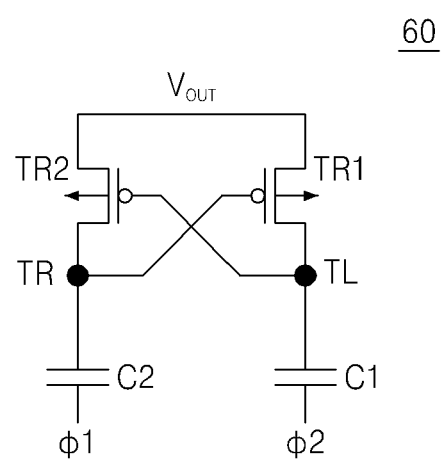
FIG. 2 is a circuit diagram of a transmission control circuit according to an embodiment of the inventive concept.

Figure (FIG.) 1 is a circuit diagram of a power supply device 1 according to an embodiment of the inventive concept. FIG. 2 is a circuit diagram of a transmission control circuit 60 according to an embodiment of the inventive concept.

Figure 1:
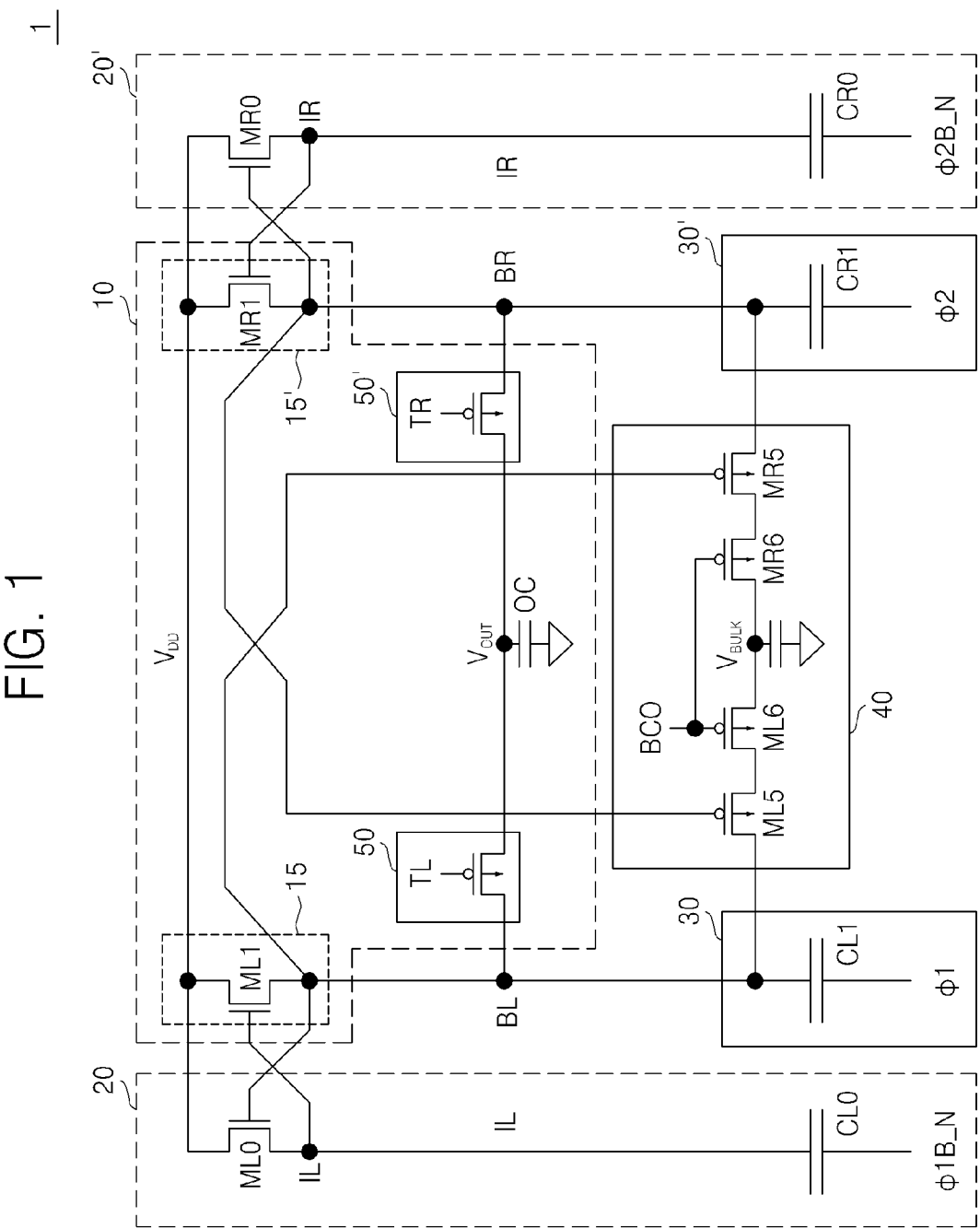
FIG. 1 is a circuit diagram of a power supply device for performing charge pumping according to an embodiment of the inventive concept.

Referring to FIGS. 1 and 2, the power supply device 1 may be used to perform main charge pumping and comprises an output unit 10, a first precharge unit 15, a second precharge unit 15', a first controller 20, a second controller 20', a first boost circuit 30, a second boost circuit 30', and a bulk voltage controller 40. The power supply device 1 may further comprise the transmission control circuit 60 of FIG. 2 and an auxiliary circuit that will be described with reference to FIGS. 3, 4 and 5 hereafter.

When a first main signal $\Phi 1$ is deactivated (e.g., a logically "low" state) and a second main signal $\Phi 2$ is activated (e.g., a logically "high" state), the power supply device 1 will precharge a first boost node BL, boost a voltage of a second boost node BR, and apply the boosted voltage of the second boost node BR to an output node Vout. Alternately, when the first main signal $\Phi 1$ is activated and the second main signal $\Phi 2$ is deactivated, the power supply device 1 will boost a voltage of the first boost node BL, precharge the second boost node BR, and apply the boosted voltage of the first boost node BL to the output node Vout. Thus, the power supply device 1 has a symmetrical circuit construction with respect to the output node Vout and performs charge pumping in response to change (activation/deactivation) in the first main signal $\Phi 1$ and the second main signal $\Phi 2$.

As noted above, the output unit 10 includes the first transmission unit 50, second transmission unit 50', first precharge unit 15, and second precharge unit 15'. The output node Vout is disposed between the first transmission unit 50 and second transmission unit 50'.

In further detail, the output unit 10 may include the first transmission unit 50 connected between the first boost node BL and the output node Vout, as well as the second transmission unit 50' connected between the second boost node BR and the output node Vout.

Each of the first transmission unit 50 and second transmission unit 50' may include at least one PMOS transistor. If a plurality of PMOS transistors are included in each of the first transmission unit 50 and second transmission unit 50', the PMOS transistors included in each of the first and second transmission units 50 and 50' are connected in parallel. Even if a plurality of PMOS transistors are included in each of the first transmission unit 50 and second transmission unit 50', the PMOS transistors included in each of the first and second transmission units 50 and 50' are not connected in series.

The first transmission unit 50 may output a boosted voltage of the first boost node BL according to the first main signal $\Phi 1$ to the output node Vout by connecting the first boost node BL and the output node Vout in response to a voltage level applied to a gate TL of the first transmission unit 50. The second transmission unit 50' may output a boosted voltage of the second boost node BR according to the second main signal $\Phi 2$ to the output node Vout by connecting the second boost node BR and the output node Vout in response to a voltage level applied to a gate TR of the second transmission unit 50'. Under these conditions, the first transmission unit 50 and second transmission unit 50' may be embodied as PMOS transistors and may thus directly output boosted voltages of the first boost node BL and the second boost node BR, respectively, without causing a drop in the boosted voltages due to a threshold voltage Vth.

The output unit 10 may further include an output capacitor OC connected between the output node Vout and ground that effectively stabilizes the boosted voltage output via the output node Vout.

The first transmission unit 50 may apply a voltage of the first boost node BL to the output node Vout. The second transmission unit 50' may apply a voltage of the second boost node BR to the output node Vout. The voltages respectively applied to the gates TL and TR of the first and second transmission units 50 and 50' may be determined according to the voltage of the output node Vout, the first main signal Φ1, and the second main signal Φ2.

The transmission control circuit 60 illustrated in the example of FIG. 2 includes a plurality of capacitors C1 and C2, and a corresponding plurality of PMOS transistors TR1 and TR2. Specifically, referring to FIGS. 1 and 2, the gate TL of the first transmission unit 50 is connected to the first PMOS transistor TR1 and the first capacitor C1. The gate TR of the second transmission unit 50' is connected to the second PMOS transistor TR2 and the second capacitor C2.

A gate of the first PMOS transistor TR1 is connected to the gate TR of the second transmission unit 50' and a gate of the second PMOS transistor TR2 is connected to the gate TL of the first transmission unit 50. The second main signal Φ2 may be supplied to one terminal of the first capacitor C1, and the first main signal Φ1 may be supplied to one terminal of the second capacitor C2.

A voltage applied to the gate TL of the first transmission unit 50 or the gate TR of the second transmission unit 50' may be equal to either a voltage of the output node Vout or the difference between the voltage of the output node Vout and a power supply voltage Vdd, according to the first main signal Φ1 and the second main signal Φ2.

Specifically, if the first main signal Φ1 is activated, the voltage applied to the gate TL of the first transmission unit 50 may be equal to the voltage of the output node Vout and the voltage applied to the gate TR of the second transmission unit 50' may be equal to the difference between the voltage of the output node Vout and the power supply voltage Vdd. If the second main signal Φ2 is activated, the voltage applied to the gate TR of the second transmission unit 50' may be equal to the voltage of the output node Vout and the voltage applied to the gate TL of the first transmission unit 50 may be equal to the difference between the voltage of the output node Vout and the power supply voltage Vdd.

Constant charge may be supplied to the output node Vout in a section where the first main signal Φ1 or the second main signal Φ2 is activated by controlling the voltage applied to the gate TL of the first transmission unit 50 and the voltage applied to the gate TR of the second transmission unit 50' using, for example, the transmission control circuit 60 shown in FIG. 2.

The first controller 20 may include a capacitor CL0 and an NMOS transistor ML0. The second controller 20' may include a capacitor CR0 and an NMOS transistor MR0. The first controller 20 may control an operation of the first precharge unit 15 in response to a first auxiliary signal Φ1$b\_n$. Thus, when the first auxiliary signal Φ1$b\_n$ is activated, the first controller 20 may conduct current to an NMOS transistor ML1 of the first precharge unit 15 so as to precharge the first boost node BL to a power supply voltage Vdd. Similarly, when a second auxiliary signal Φ2$b\_n$ is activated, the second controller 20' may conduct current to an NMOS transistor MR1 of the second precharge unit 15' so as to precharge the second boost node BR to the power supply voltage Vdd.

The gate of the NMOS transistor ML0 of the first controller 20 is connected to the first boost node BL, and a gate of the NMOS transistor MR0 of the second controller 20' is connected to the second boost node BR. When the power supply voltage Vdd is applied to the first boost node BL or the second boost node BR, current is conducted to the NMOS transistor ML0 or MR0. When current is conducted to the NMOS transistor ML0 of the first controller 20 or the NMOS transistor MR0 of the second controller 20', the power supply voltage Vdd is applied to a node IL or a node IR.

Furthermore, the first controller 20 may boost the power supply voltage Vdd, which is applied to the node IL, to a voltage 2Vdd via the capacitor CL0 and then apply the voltage 2Vdd to a gate of the first precharge unit 15. The second controller 20' may boost the power supply voltage Vdd, which is applied to the node IR, to the voltage 2Vdd via the capacitor CR0, and then apply the voltage 2Vdd to a gate of the second precharge unit 15'.

A phase of the first auxiliary signal Φ1$b\_n$ is opposite to that of the first main signal Φ1. A phase of the second auxiliary signal Φ2$b\_n$ is opposite to that of the second main signal Φ2.

The first main signal Φ1 and the second main signal Φ2 may be provided as clock signals having a high overlapping state, whereas the first auxiliary signal Φ1$b\_n$ and the second auxiliary signal Φ2$b\_n$ may be provided as clock signals having a low overlapping state.

The first precharge unit 15 may be used to precharge a voltage of the first boost node BL to the power supply voltage Vdd under control of the first controller 20. The second precharge unit 15' may be sued to precharge a voltage of the second boost node BR to the power supply voltage Vdd under control of the second controller 20'.

The first precharge unit 15 may include the NMOS transistor ML1 connected between a power supply voltage Vdd source and the first boost node BL and having a gate connected to the node IL of the first controller 20. The second precharge unit 15' may include the NMOS transistor MR1 connected between the power supply voltage Vdd source and the second boost node BR and having a gate connected to the node IR of the second controller 20'.

The boost circuit unit 30 may increase a voltage of the first boost node BL in response to the first main signal Φ1. The boost circuit unit 30' may increase a voltage of the second boost node BR in response to the second main signal Φ2.

Specifically, the boost circuit unit 30 may include a first boost capacitor CL1 having one terminal connected to the first boost node BL and another terminal to which the first main signal Φ1 is supplied. The boost circuit unit 30' may include a second boost capacitor CR1 having one terminal connected to the second boost node BR and another terminal to which the second main signal Φ2 is supplied. If the activated levels of the first main signal Φ1 and the second main signal Φ2 are equal to the power supply voltage Vdd, then the first and second boost capacitors CL1 and CR1 may boost voltages of the first and second boost nodes BL and BR to the voltage 2Vdd that doubles the power supply voltage Vdd in response to the first and second main signals Φ1 and Φ2, respectively.

The bulk voltage controller 40 illustrated in the example of FIG. 1 includes two PMOS transistors ML5 and ML6 series connected between the first boost node BL and a bulk node Vbulk, and two PMOS transistors MR5 and MR6 series connected between the second boost node BR and the bulk node Vbulk. However, the arrangement order of these transistors may be varied.

Thus, the bulk voltage controller 40 includes the plurality of first and second bulk connection transistors ML5 and MR5. The first bulk connection transistor ML5 controls a connection between the bulk node Vbulk and the first boost node BL, based on the second main signal Φ2. The second bulk connection transistor MR5 controls a connection between the bulk node Vbulk and the second boost node BR, based on the first main signal Φ1.

The bulk voltage controller 40 may further include the plurality of first and second bulk control transistors ML6 and MR6. The first bulk control transistor ML6 controls a connection between the bulk node Vbulk and the first boost node BL, based on a bulk control signal BCO. The second bulk control transistor MR6 controls a connection between the bulk node Vbulk and the second boost node BR, based on the bulk control signal BCO.

A second terminal of the first bulk control transistor ML6 may be connected to the bulk node Vbulk, and a first terminal of the first bulk control transistor ML6 may be connected to a second terminal of the first bulk connection transistor ML5. The bulk control signal BCO may be supplied to a gate of the first bulk control transistor ML6. A first terminal of the second bulk control transistor MR6 may be connected to the bulk node Vbulk and a second terminal of the second bulk control transistor MR6 may be connected to a first terminal of the second bulk connection transistor MR5. The bulk control signal BCO may also be supplied to a gate of the second bulk control transistor MR6.

The second terminal of the first bulk connection transistor ML5 may be connected to the first terminal of the first bulk control transistor ML6, and a first terminal of the first bulk connection transistor ML5 may be connected to the first boost node BL. A voltage of the second boost node BR may be applied to a gate of the first bulk connection transistor ML5.

The first terminal of the second bulk connection transistor MR5 may be connected to the second terminal of the second bulk control transistor MR6, and a second terminal of the second bulk connection transistor MR5 may be connected to the second boost node BR. A voltage of the first boost node BL may be applied to a gate of the second bulk connection transistor MR5.

The order in which the transistors included in the bulk voltage controller 40 (i.e., the first and second bulk control transistors ML6 and MR6 and the first and second bulk connection transistors ML5 and MR5) are arranged is not limited to only the illustrated embodiment. For example, the second and first terminals of the first bulk connection transistor ML5 may be connected to the bulk node Vbulk and the second terminal of the first bulk control transistor ML6, respectively. The voltage of the second boost node BR may be applied to the gate of the first bulk connection transistor ML5. The first and second terminals of the second bulk connection transistor MR5 may be connected to the bulk node Vbulk and the first terminal of the second bulk control transistor MR6, respectively. The voltage of the first boost node BL may be applied to the gate of the second connection transistor MR5.

The first and second terminals of the first bulk control transistor ML6 may be connected to the first boost node BL and the first terminal of the first bulk connection transistor ML5, respectively. The bulk control signal BCO may be supplied to the gate of the first bulk control transistor ML6.

The first and second terminals of the second bulk control transistor MR6 may be connected to the second terminal of the second bulk connection transistor MR5 and the second boost node BR, respectively. The bulk control signal BCO may also be supplied to the gate of the second bulk control transistor MR6.

When the bulk control signal BCO is deactivated, the bulk voltage controller 40 may connect the bulk node Vbulk to the output node Vout in response to voltage levels of the first boost node BL and the second boost node BR.

That is, when a voltage of the output node Vout is less than a preset reference voltage, the bulk voltage controller 40 may activate the bulk control signal BCO so as to disconnect the first boost node BL or the second boost node BR from the bulk node Vbulk.

When the voltage of the output node Vout is greater than the preset reference voltage, the bulk voltage controller 40 may deactivate the bulk control signal BCO to connect the first boost node BL or the second boost node BR to the bulk node Vbulk.

Figure 3:
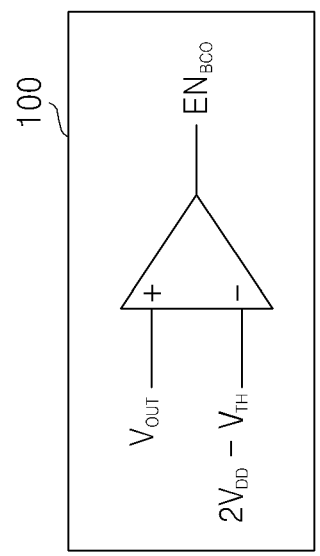
FIG. 3 is a circuit diagram of a comparator that compares a voltage of an output node with a preset reference voltage according to an embodiment of the inventive concept.

FIG. 3 is a circuit diagram illustrating a comparator 100 that may be used to compare a voltage of an output node Vout with a preset reference voltage according to an embodiment of the inventive concept.

Referring to FIGS. 1 and 3, the output node Vout is connected to the bulk node Vbulk via the first and second bulk connection transistors ML5 and MR5 and the first and second bulk control transistors ML6 and MR6. If current is conducted to all the first and second bulk connection transistors ML5 and MR5 and the first and second bulk control transistors ML6 and MR6, then a voltage of the bulk node Vbulk falls when a voltage of the output node Vout falls. However, when a voltage applied to the bulk node Vbulk falls below a voltage applied to a source or drain, a bias is formed between the source and the bulk node Vbulk or between the drain and the bulk node Vbulk in a forward direction. Thus, a large amount of current is supplied to the bulk node Vbulk potentially causing the latch-up phenomenon. Hence, the voltage of the bulk node Vbulk should be greater than or equal to a highest voltage from among voltages of the first boost node BL, the second boost node BR, and the output node Vout.

In order to maintain the voltage of the bulk node Vbulk at high, the bulk node Vbulk should be disconnected from the output node Vout. Thus, the comparator 100 compares a voltage of the output node Vout with a preset reference voltage and outputs a resulting comparison logic value ENbco. The level of the preset reference voltage may be determined such that the latch-up phenomenon is prevented. Referring to FIG. 3, for example, a voltage (2Vdd-Vth) may be used as the preset reference voltage to be compared with the voltage of the output node Vout.

For example, if the voltage of the output node Vout is greater than the preset reference voltage, the comparator 100 may output a logic value '1' as the value ENbco. If the voltage of the output node Vout is less than the preset reference voltage, the comparator 100 may output a logic value '0' as the value ENbco. The logic value ENbco output from the comparator 100 may applied to an auxiliary pump or a bulk control signal booster as will be described with reference to FIGS. 4 and 5 hereafter.

Figure 4:
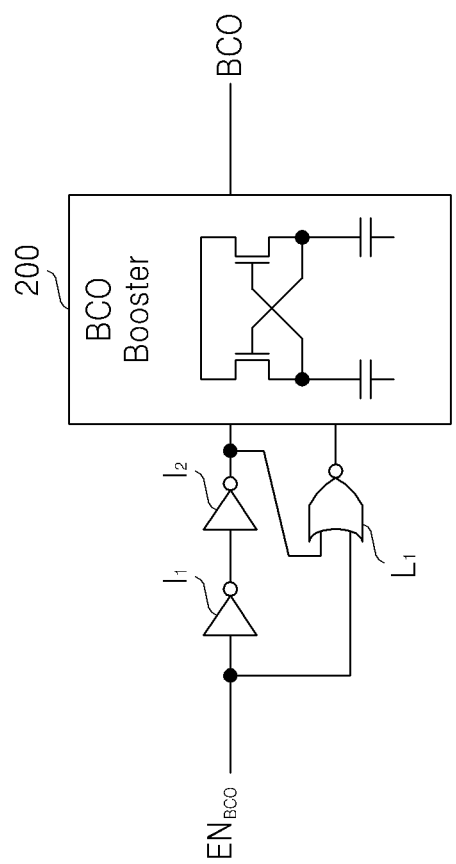
FIG. 4 is a schematic circuit diagram of a bulk control signal booster according to an embodiment of the inventive concept.

FIG. 4 is a circuit diagram illustrating a bulk control signal booster 200 according to an embodiment of the inventive concept. The bulk control signal booster 200 may include a voltage doubler including a plurality of transistors and capacitors.

Referring to FIGS. 1, 3, and 4, the logic value ENbco output from the comparator 100 is applied to the bulk control signal booster 200.

The bulk control signal booster 200 may then provide a bulk control signal BCO, based on the logic value ENbco received from the comparator 100. The logic value ENbco output from the comparator 100 may be sequentially applied to inverters I1 and I2 and then to a logic device L1 so that a phase of the logic value ENbco may be adjusted, and may then be input to the bulk control signal booster 200. However, the number and configuration of inverters and logic devices used in a bulk control signal booster, like the one illustrated in FIG. 4 will vary with design. When the bulk control signal BCO is output, the intensity of the bulk control signal BCO may be increased using the voltage doubler.

The bulk control signal BCO is applied to the gates of the first and second bulk control transistors ML6 and MR6 that are PMOS transistors. The first and second bulk control transistors ML6 and MR6 electrically connect the output node Vout and the bulk node Vbulk. The first and second bulk control transistors ML6 and MR6 may control a period during which the bulk node Vbulk and the output node Vout are electrically connected, in response to the bulk control signal BCO. Thus, a voltage of the bulk node Vbulk may be maintained constant regardless of a change in the level of the voltage at the output node Vout.

Figure 5:
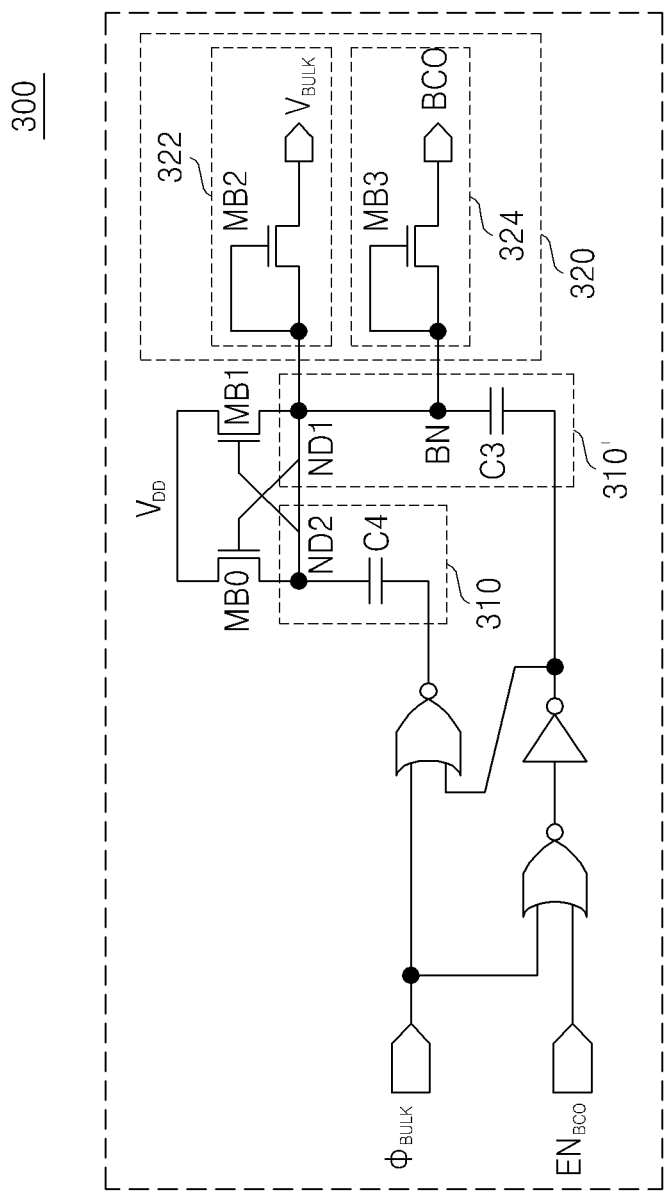
FIG. 5 is a circuit diagram of an auxiliary pump included in the power supply device of FIG. 1 according to an embodiment of the inventive concept.

FIG. 5 is a circuit diagram illustrating an auxiliary pump 300 that may be included in the power supply device 1 of FIG. 1 according to an embodiment of the inventive concept.

Referring to FIGS. 1, 4, and 5, the bulk control signal booster 200 may be used during a period wherein the voltage of the output node Vout changes due to large loading. With this configuration, the power supply device 1 may stably perform charge pumping to generate a boosted voltage even when significantly loaded.

During a power-up period of an initial operation of the power supply device 1, all voltages of the first boost node BL, the second boost node BR, and the output node Vout are assumed to be deactivated. Thus, during the power-up period, current should not be conducted to the first and second bulk control transistors ML6 and MR6 and the first and second bulk connection transistors ML5 and MR5. If current is conducted, the voltage of the bulk node Vbulk will be equal to ground voltage.

However, if during the power-up period, current is prevented from being conducted to the first and second bulk control transistors ML6 and MR6 and the first and second bulk connection transistors ML5 and MR5, then a voltage of the bulk node Vbulk cannot be boosted.

Figure 6:
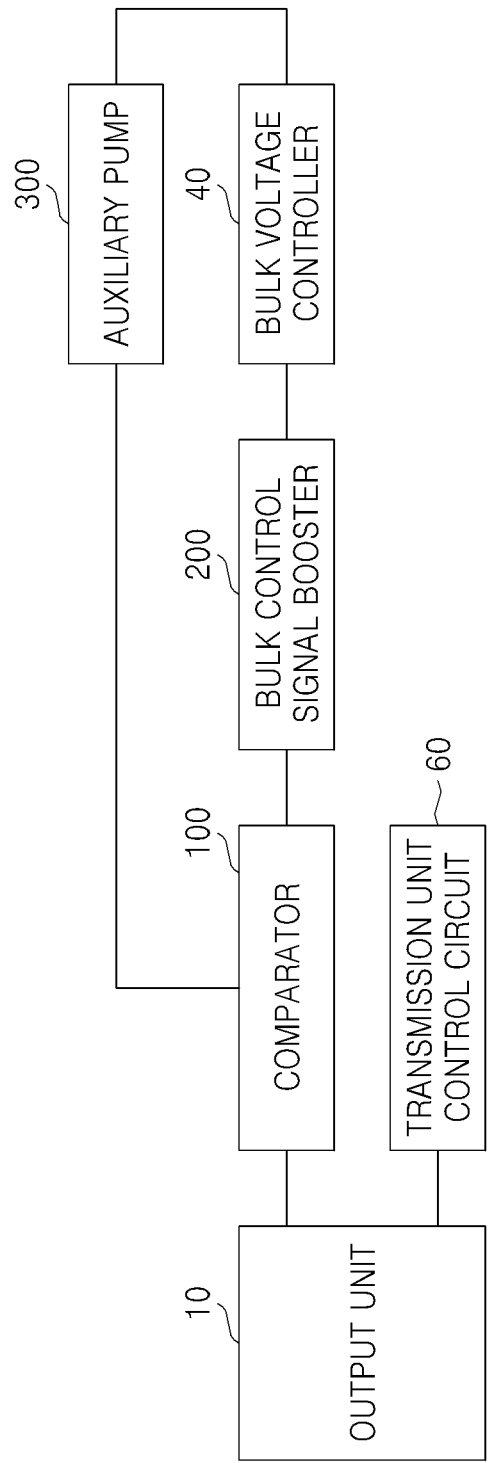
FIG. 6 is a block diagram illustrating a connection among the devices illustrated FIGS. 1 to 5 according to an embodiment of the inventive concept.

Thus, during the power-up period, a voltage may be applied to the bulk node Vbulk by using the auxiliary pump 300 of FIG. 6.

The auxiliary pump 300 receives the logic value ENbco output from the comparator 100 and a clock signal Φbulk supplied to the bulk node Vbulk. The auxiliary pump 300 may include auxiliary boost circuit units 310 and 310' and an auxiliary output unit 320. The auxiliary boost circuit units 310 and 310' boost voltages of a first auxiliary boost node ND1 and a second auxiliary boost node ND2 in response to the logic value ENbco and the clock signal Φbulk, respectively. The auxiliary output unit 320 outputs a bulk control signal BCO and a precharge bulk voltage Vbulk, in response to the voltage levels of the first and second auxiliary boost nodes ND1 and ND2.

Similar to the boost circuit units 30 and 30' of FIG. 1, the auxiliary boost circuit units 310 and 310' include a first auxiliary capacitor C3 having one terminal connected to the first auxiliary boost node ND1 and another terminal to which a signal based on the value ENbco output from the comparator 100 and the clock signal Φbulk supplied to the bulk node Vbulk are supplied. Also, the auxiliary boost circuit units 310 and 310' include a second auxiliary capacitor C4 having one terminal connected to the second auxiliary boost node ND2 and another terminal to which the signal based on the value ENbco output from the comparator 100 and the clock signal Φbulk supplied to the bulk node Vbulk are supplied.

The auxiliary output unit 320 includes a bulk voltage output unit 322 and a bulk control signal output unit 324. The bulk control signal output unit 324 outputs the bulk control signal BCO in response to a voltage level of the first auxiliary boost node ND1. The bulk voltage output unit 322 outputs the precharge bulk voltage Vbulk for precharging the bulk node Vbulk.

Since the bulk voltage output unit 322 includes an NMOS transistor, when a voltage boosted by the first auxiliary boost node ND1 is applied to the bulk voltage output unit 322, the bulk voltage output unit 322 outputs a bulk voltage Vbulk that is reduced by the a threshold voltage Vth than the boosted voltage.

The bulk control signal output unit 324 outputs the bulk control signal BCO to the gates of the first and second bulk control transistors ML6 and MR6 of the bulk voltage controller 40.

FIG. 6 is a block diagram illustrating connection among the devices previously described in relation to FIGS. 1 to 5 according to certain embodiments of the inventive concept.

Referring to FIGS. 1 to 5, the output unit 10 includes the first transmission unit 50 and second transmission unit 50', and the respective gates of transistors included in the first transmission unit 50 and second transmission unit 50' are connected to a (first) node TL and a (second) node TR, respectively. The gates of the first PMOS transistor TR1 and the second PMOS transistor TR2 included in the transmission control circuit 60 are connected to the gate TL of the first transmission unit 50 and the gate TR of the second transmission unit 50', respectively.

An output voltage output from the output unit 10 is applied to the comparator 100. In other words, an input of the comparator 100 is connected to the output node Vout. The logic value ENbco output from the comparator 100 is input to the bulk control signal booster 200 or the auxiliary pump 300. The bulk control signal booster 200 may output a bulk control signal BCO, based on the logic value ENbco received from the comparator 100. The bulk control signal BCO may be supplied to the gates of the first and second bulk control transistors ML6 and MR6 of the bulk voltage controller 40.

Figure 7B:
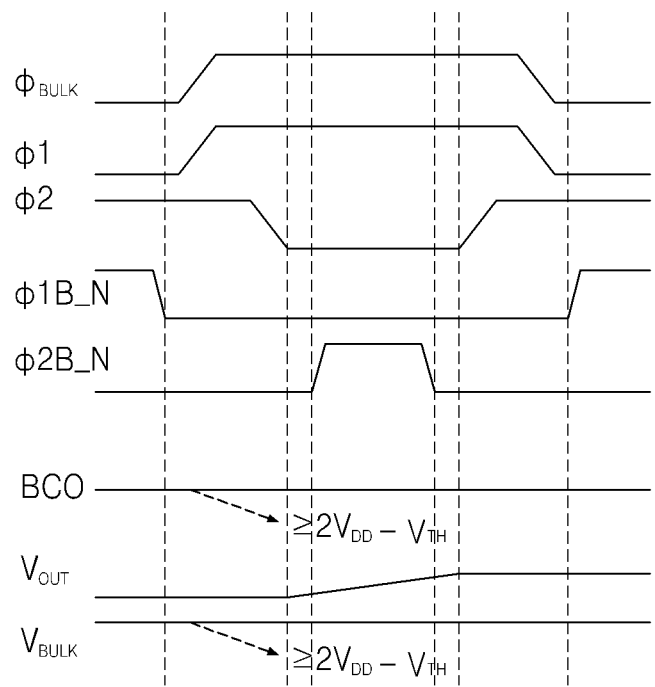
Figure 7C:
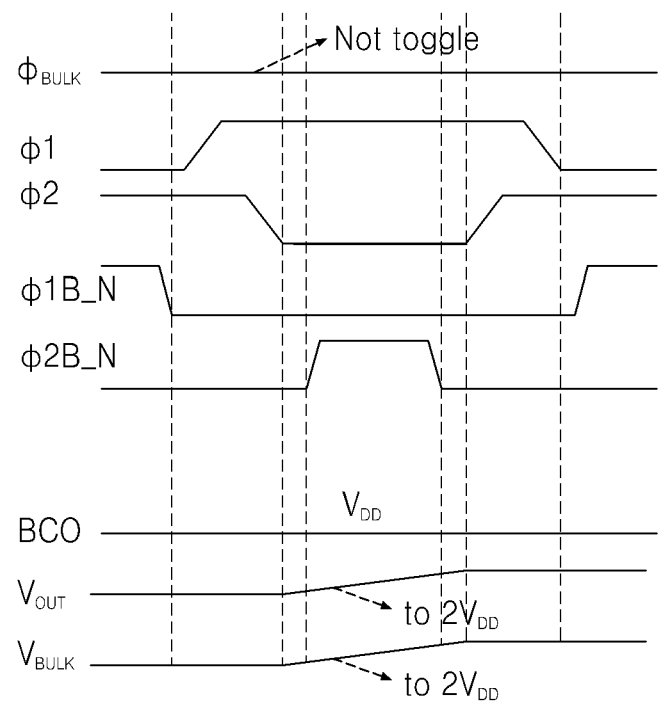

FIGS. 7A to 7C are timing diagrams further illustrating charge pumping performed by a power supply device according to an embodiment of the inventive concept.

FIG. 7A is a timing diagram illustrating a power-up operating period for a charge pump according to an embodiment of the inventive concept.

During the power-up operating period, a clock signal Φbulk input to a bulk node Vbulk is toggled, and a first boost node BL, a second boost node BR, and an output node Vout are assumed to be low. Also, in this case, a first main signal Φ1, a second main signal Φ2, a first auxiliary signal Φ1$b\_n$, and a second auxiliary signal Φ2$b\_n$ are not related thereto.

In this period, when the clock signal Φbulk input to the bulk node Vbulk and a logic value ENbco output from the comparator 100 are supplied to the auxiliary pump 300 of FIG. 5, a voltage of the bulk node Vbulk is precharged. Also, a bulk control signal BCO has the same voltage as that of the bulk node Vbulk so as to prevent the voltage of the bulk node Vbulk from leaking when the voltage of the bulk node Vbulk increases.

FIG. 7B is a timing diagram further illustrating normal operating periods wherein the power supply device 1 of FIG. 1 stably generates a boosted voltage according to an embodiment of the inventive concept.

In other words, FIG. 7B is a timing diagram for a period wherein a voltage apparent at the output node Vout might change due to high loading. Yet, the power supply device 1 of FIG. 1 is able to stably perform charge pumping and generate a boosted voltage.

As the voltage of the output node Vout falls, the bulk control signal BCO is applied to the first bulk control transistor ML6 or the second bulk control transistor MR6, thereby disconnecting the output node Vout and the bulk node vbulk from each other. When the bulk control signal BCO is activated and applied to the first bulk control transistor ML6 or the second bulk control transistor MR6, the first bulk control transistor ML6 or the second bulk control transistor MR6 is opened.

Also, the clock signal Φbulk input to the bulk node Vbulk is kept activated, and the voltage of the bulk node Vbulk is maintained higher than the voltage of the output node Vout.

FIG. 7C is a timing diagram further illustrating operation of the power supply device 1 of FIG. 1 as idealistically performing charge pumping according to an embodiment of the inventive concept.

In this case, since the voltage of the output node Vout is greater than the preset reference voltage, a connection between the bulk node Vbulk and the output node Vout does not need to be controlled. Thus, the voltage of the bulk node vbulk does not need to be precharged, and the voltages of the first boost node BL and the second boost node BR are increased using the first main signal Φ1, the second main signal Φ2, the first auxiliary signal Φ1$b\_n$, and the second auxiliary signal Φ2$b\_n$ and are then applied to the output node Vout.

FIGS. 8A to 8E are respective graphs showing certain simulation results for charge pumping performed by a power supply device according to an embodiment of the inventive concept was compared with charge pumping performed by a conventional charge pump Ref.

Figure 8A:
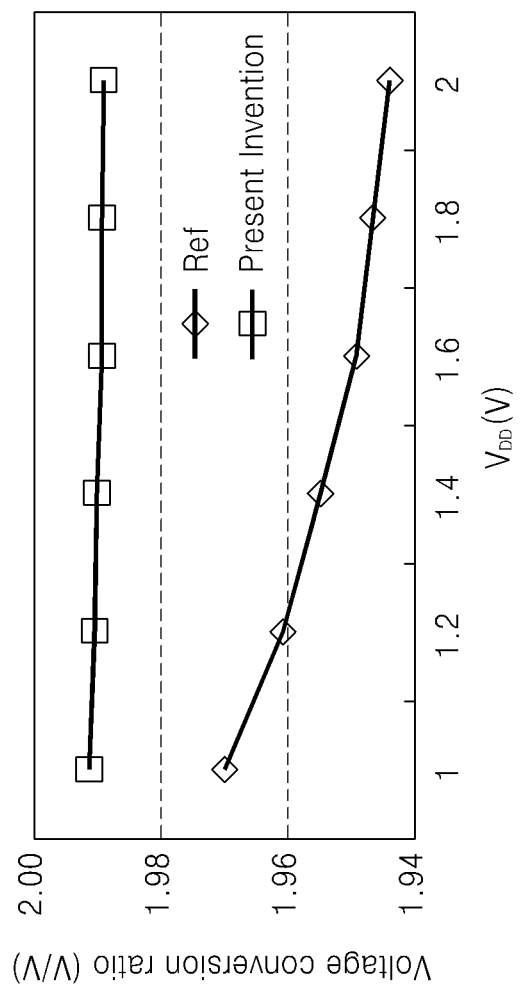
FIGS. 8A to 8E are graphs showing simulation results comparing charge pumping performed by a power supply device according to an embodiment of the inventive concept and charge pumping performed by a conventional charge pump.

FIG. 8A is a graph showing a variation in a voltage conversion ratio. In the case of the conventional charge pump Ref, the higher a power supply voltage $V_{DD}$, the lower the voltage conversion ratio. On the other hand, in the case of the power supply device according to an embodiment of the inventive concept, a constant voltage conversion ratio was obtained.

Figure 8B:
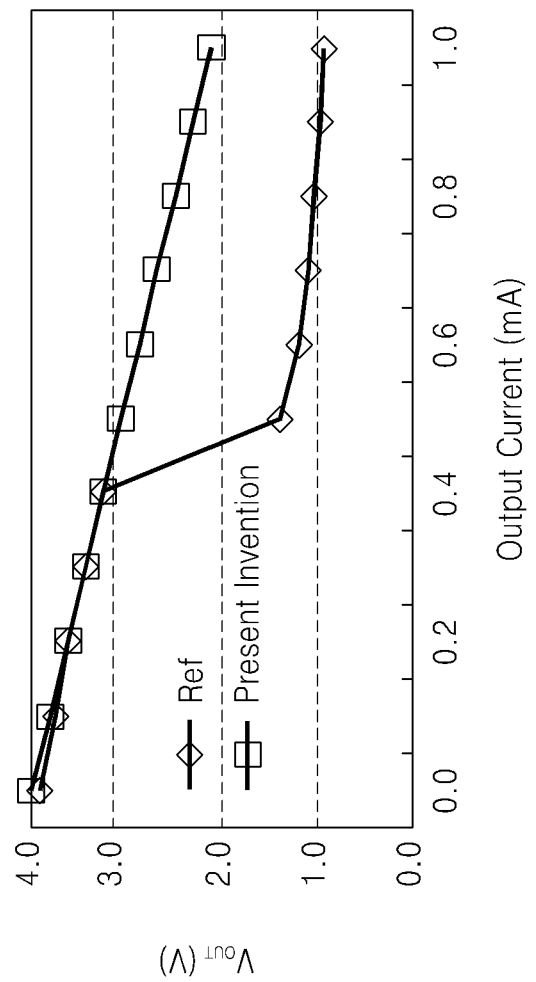

FIG. 8B is a graph showing a decrease in a voltage of an output node Vout according to an increase in an amount of output current. In the case of the conventional charge pump Ref, as the amount of output current increased, the voltage of the output node Vout suddenly and sharply decreased. On the other hand, in the power supply device according to an embodiment of the inventive concept, the voltage of the output node Vout linearly decreased with a small slope.

Figure 8C:
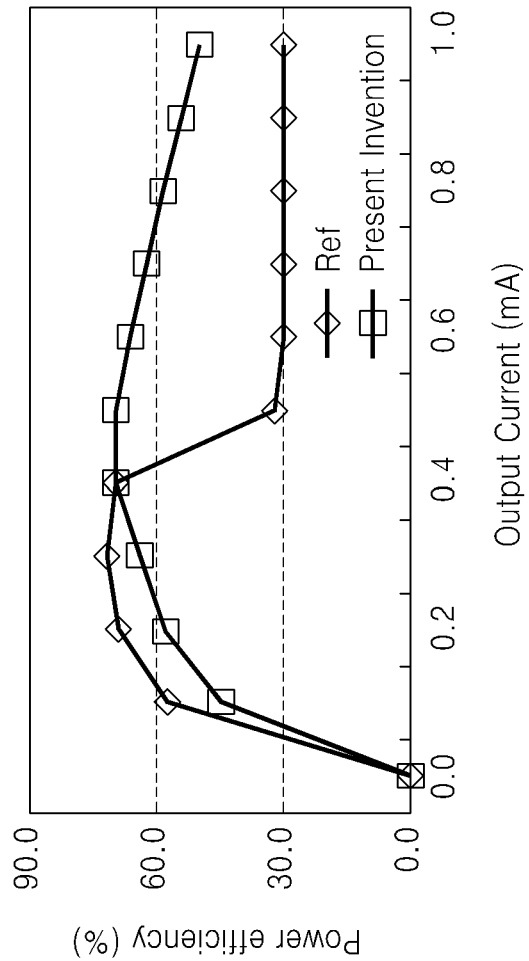

FIG. 8C is a graph showing the relationship between an increase in the amount of output current and power efficiency. In the case of the conventional charge pump Ref, as the amount of output current increased, the power efficiency suddenly and sharply decreased. On the other hand, in the case of the power supply device according to an embodiment of the inventive concept, even if the amount of output current increased, the power efficiency did not greatly decrease.

Figure 8D:
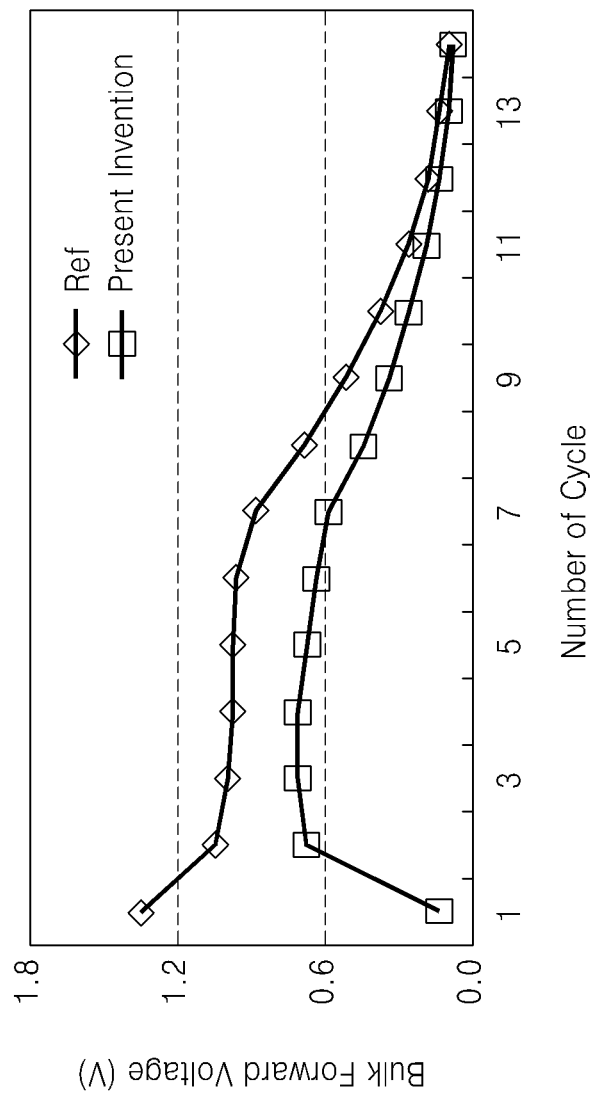

FIG. 8D is a graph showing the relationship between the number of clock signal cycles and a bulk forward voltage.

The bulk forward voltage in the case of the power supply device according to an embodiment of the inventive concept was less than that in the case of the conventional charge pump Ref, thereby preventing the latch-up phenomenon from occurring.

Figure 8E:
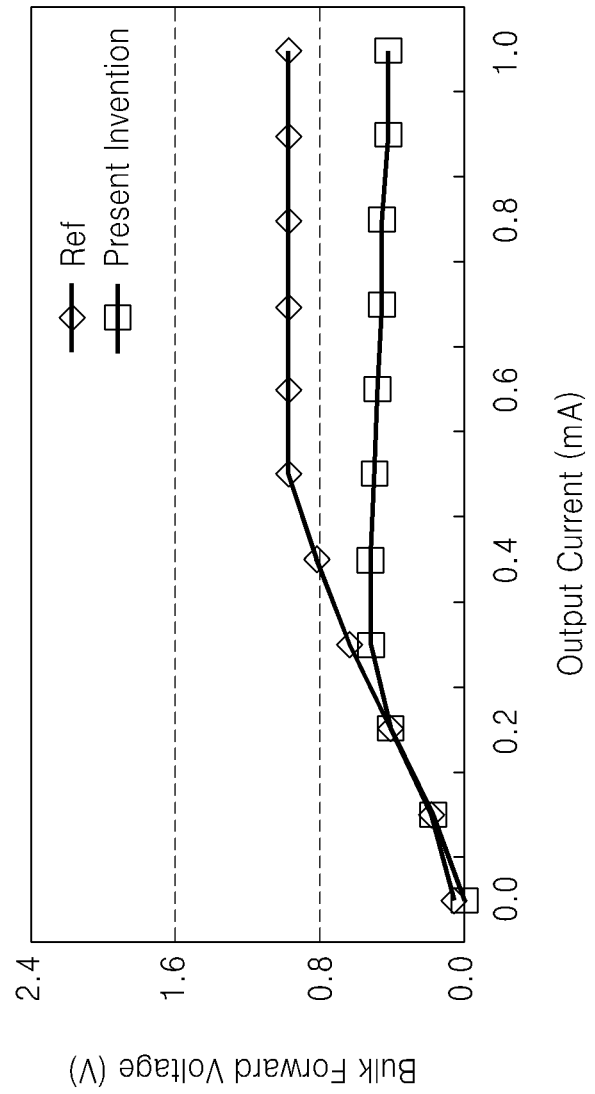

FIG. 8E is a graph showing the relationship between an increase in the amount of output current and the bulk forward voltage.

Even if the amount of output current increased, the bulk forward voltage in the case of the power supply device according to an embodiment of the inventive concept was less than in the case of the conventional charge pump Ref.

Figure 9:
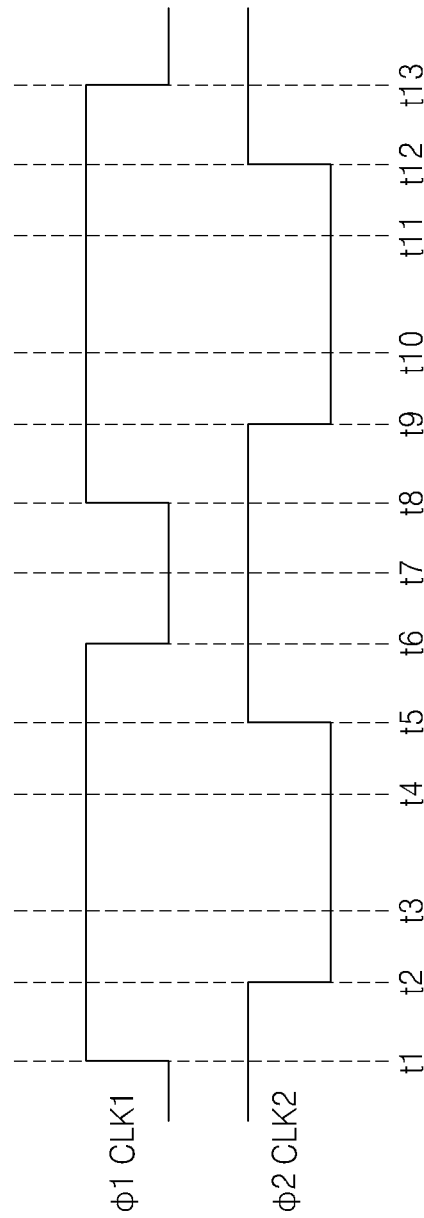
FIG. 9 is a timing diagram of clock signals according to an embodiment of the inventive concept.

FIG. 9 is a timing diagram illustrating clock signals that may be used in certain embodiments of the inventive concept. That is, FIG. 9 illustrates a relationship between a first main signal Φ1 and a second main signal Φ2 according to an embodiment of the inventive concept. Referring to FIG. 9, the first main signal Φ1 and the second main signal Φ2 are set in such a manner that their logic states are not substantially the same and they are both activated when the logic states of these signals are the same.

In other words, both the first main signal Φ1 and the second main signal Φ2 are deemed activated during a logically "high" state during time periods t1 to t2 and t5 to t6 in which these signals have the same logic state.

Figure 10:
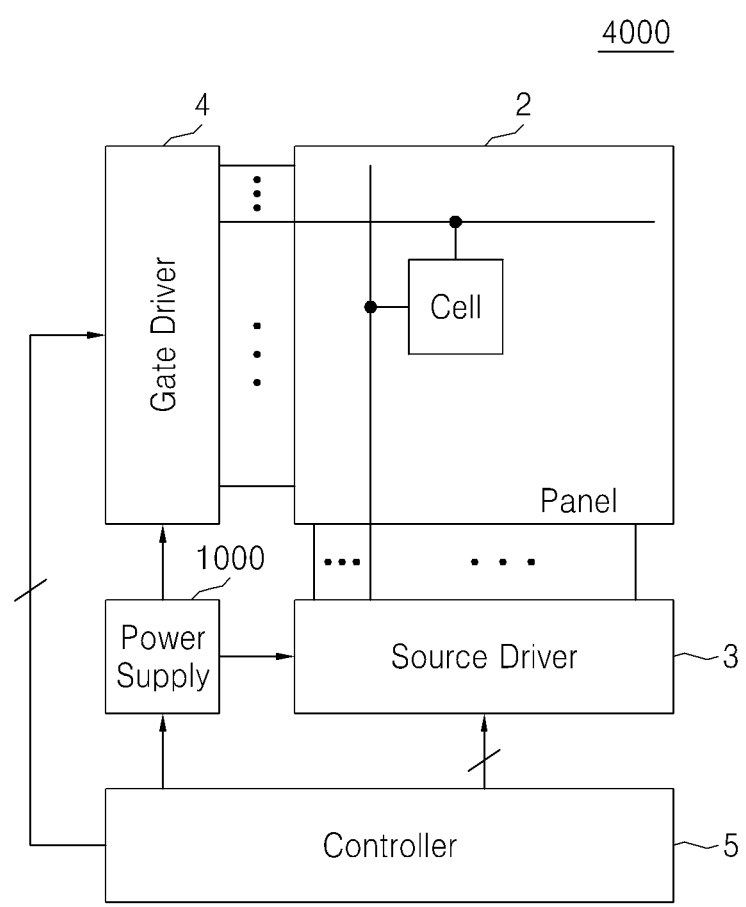
FIG. 10 is a block diagram of a display apparatus including a power supply device, according to an embodiment of the inventive concept.

FIG. 10 is a block diagram of a display apparatus 4000 that may incorporate a power supply device 1000 according to an embodiment of the inventive concept.

Referring to FIG. 10, the display apparatus 4000 includes a panel 2, a source driver 3, a gate driver 4, a controller 5, and the power supply device 1000.

The panel 2 includes a plurality of data lines, a plurality of gate lines, and a plurality of pixels connected between the plurality of data lines and the plurality of gate lines.

The source driver 3 outputs analog voltages to drive the plurality of data lines (or the plurality of gate lines) included in the panel 2, in response to control signals received from the controller 5 and a voltage output from the power supply device 1000.

The gate driver 4 sequentially drives the plurality of gate lines (or scan lines) included in the panel 2 so that the analog voltages output from the source driver 3 may be applied to the plurality of pixels, in response to the control signals received from the controller 5 and the voltage output from the power supply device 1000.

The power supply device 1 or 1000 described above with reference to FIGS. 1 to 9 may apply a boosted voltage to the source driver 3 or the gate driver 4, in response to a signal received from the controller 5.

The controller 5 generates timing control signals for controlling a timing when a plurality of data lines of the source driver 3 and a plurality of gate lines of the gate driver 4 are operated.

Figure 11:
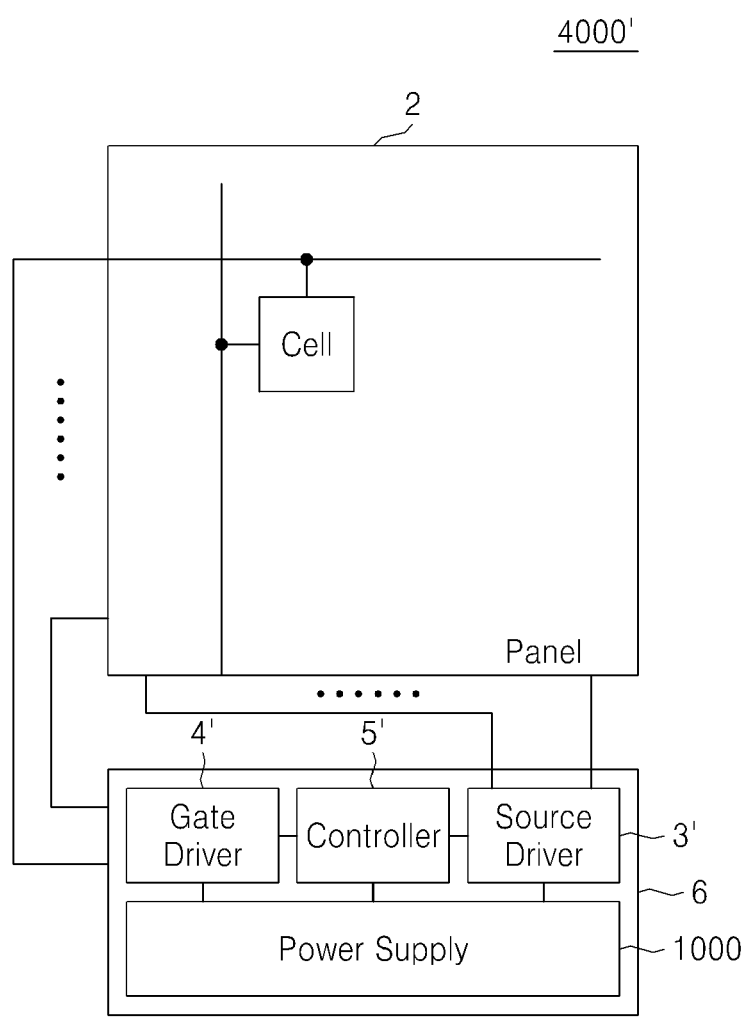
FIG. 11 is a block diagram of a display apparatus including a power supply device, according to another embodiment of the inventive concept.

FIG. 11 is a block diagram of a display apparatus 4000' that may incorporate a power supply device 1000 according to another embodiment of the inventive concept.

Referring to FIG. 11, the display apparatus 4000' includes a panel 2 and a display driver 6.

In FIG. 11, the display driver 6 is illustrated in one chip or package in which a source driver 3', a gate driver 4', a controller 5', and the power supply device 1000 are disposed, but the inventive concept is not limited thereto.

Figure 12:
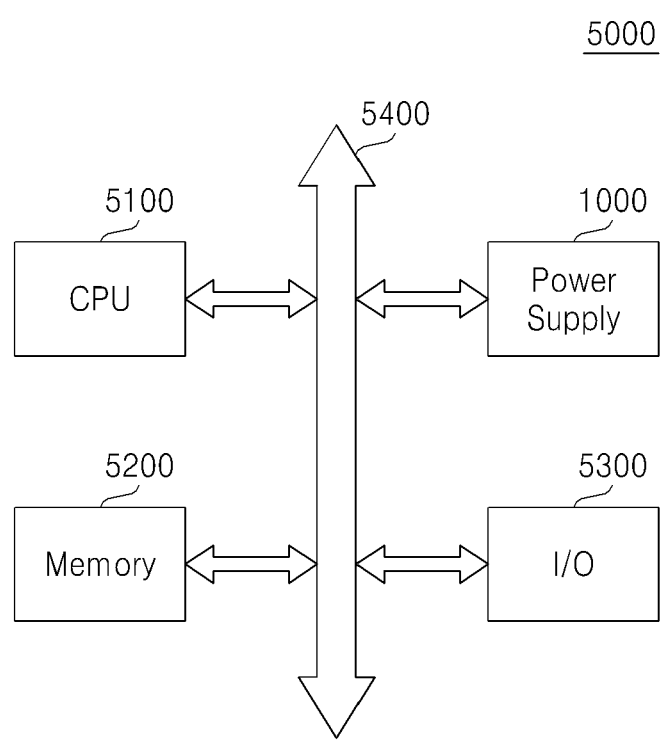
FIG. 12 is a block diagram of an electronic apparatus including a power supply device, according to an embodiment of the inventive concept.

FIG. 12 is a block diagram of an electronic apparatus 5000 that may incorporate a power supply device 1000 according to an embodiment of the inventive concept.

Referring to FIG. 12, the electronic apparatus 5000 includes the power supply device 1000, a central processing unit (CPU) 5100, a memory device 5200, an input/output (I/O) interface unit 5300, and a bus 5400.

The CPU 5100 may control exchange of data among the power supply device 1000, the memory device 5200, and the I/O interface unit 5300, via the bus 5400.

The memory device 5200 may be embodied as a nonvolatile memory device. The nonvolatile memory device may include a plurality of nonvolatile memory cells. Otherwise, the memory device 5200 may be embodied as a volatile memory device. The volatile memory device may be random access memory (RAM). For example, an output of the power supply device 1000 may be supplied to dynamic RAM (DRAM).

The electronic apparatus 5000 may be a personal computer (PC), a portable computer, a portable mobile communication apparatus, or a consumer equipment (CE). Examples of the portable mobile communication apparatus include a mobile phone, a personal digital assistant (PDA), and a portable multimedia player (PMP). The CE may be a digital TV, a home automation apparatus, or a digital camera. The electronic apparatus 5000 may be e-book, a game console, a game controller, a navigator, or an electronic musical instrument.

A power supply device according to an embodiment of the present invention may be installed in a display apparatus or an electronic apparatus, but the inventive concept is not limited thereto. For example, a power supply device according to an embodiment of the inventive concept may be installed in a semiconductor device, e.g., a CPU, a controller, or a memory device. A power supply device according to an embodiment of the inventive concept may be included in a semiconductor system. The semiconductor system may be a product including a memory device and a controller or may be an apparatus including a plurality of semiconductor devices.

Figure 13:
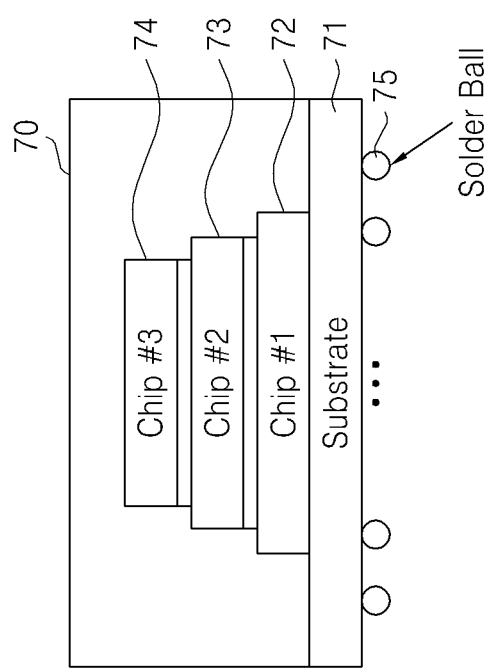
FIG. 13 is a schematic diagram illustrating a multi-chip package including a plurality of semiconductor devices according to an embodiment of the inventive concept.

FIG. 13 is a schematic diagram illustrating a multi-chip package 70 including a plurality of semiconductor devices chip#1 72 to Chip#3 74, according to an embodiment of the inventive concept. Referring to FIG. 13, the multi-chip package 70 may include the plurality of semiconductor devices chip#1 72 to Chip#3 74 that are sequentially disposed on a package substrate 71. Each of the plurality of semiconductor devices chip#1 72 to Chip#3 74 may be a CPU, a controller, or a memory device. The memory device may be a volatile memory device or a nonvolatile memory device. The power supply device 1 or 1000 illustrated in FIG. 1, 10, 11, or 12 may be installed in at least one semiconductor device from among the plurality of semiconductor devices chip#1 72 to Chip#3 74, or may be disposed on the package substrate 71. A through-silicon via (TSV) (not shown), a connection line (not shown), a bump (not shown), or a solder ball 75 may be used to electrically connect the plurality of semiconductor devices chip#1 72 to Chip#3 74 with one another.

According to embodiments of the inventive concept, it is possible to continuously charge boosted voltage to an output terminal by controlling the gate of a transistor by interlocking an output voltage and a voltage applied to the gate of a transistor with each other. Thus, a stable high output voltage may be obtained, thereby maintaining current supply capabilities.

According to an embodiment of the inventive concept, a power supply device may include an auxiliary bulk control device consisting of PMOS transistors to overcome PMOS bulk forwarding, thereby preventing a latch-up phenomenon.

Also, it is possible to reduce a reversion loss when charge pumping is performed.

While the inventive concept has been particularly shown and described with reference to embodiments thereof, it will be understood by those of ordinary skill in the art that various changes in form and details may be made therein without departing from the scope of the invention as defined by the appended claims.

What is claimed is:

1. A power supply device comprising:
a boost circuit unit that boosts voltages of a first boost node and a second boost node in response to a first main signal and a second main signal, respectively;
an output unit including a first transmission unit and a second transmission unit that provides a boosted voltage via an output node, wherein the first transmission unit applies the voltage of the first boost node to the output node and the second transmission unit applies the voltage of the second boost node to the output node; and
a bulk voltage controller, connected between the first boost node and the second boost node, that controls a connection between the output node and a bulk node in response to a bulk control signal,
wherein first and second voltages respectively applied to gates of the first transmission unit and the second transmission unit are determined according to a voltage apparent at the output node, the first main signal and the second main signal.

2. The power supply device of claim 1, further comprising:
a comparator that compares the voltage apparent at the output node with a preset reference voltage and provides a comparison value;
an auxiliary pump that provides a bulk voltage precharging the bulk control signal and the bulk node in response to the comparison value; and
an auxiliary circuit including a bulk control signal booster that provides the bulk control signal in response to the comparison value.

3. The power supply device of claim 1, wherein one of the first and second voltages is equal to the voltage of the output node, and the other one of the first and second voltages is equal to a difference between the voltage of the output node and a power supply voltage in response to the first main signal and the second main signal.

4. The power supply device of claim 3, wherein, if the first main signal is activated, then the first voltage applied to the gate of the first transmission unit is equal to the voltage of the output node, and the second voltage applied to the gate of the second transmission unit is equal to the difference between the voltage of the output node and the power supply voltage, and
if the second main signal is activated, then the second voltage applied to the gate of the second transmission unit is equal to the voltage of the output node, and the first voltage applied to the gate of the first transmission unit is equal to the difference between the voltage of the output node and the power supply voltage.

5. The power supply device of claim 1, wherein the gate of the first transmission unit is connected to a first PMOS transistor and a first capacitor, and the gate of the second transmission unit is connected to a second PMOS transistor and a second capacitor,
a gate of the first PMOS transistor is connected to the gate of the second transmission unit, and a gate of the second PMOS transistor is connected to the gate of the first transmission unit, and
the second main signal is applied to one terminal of the first capacitor, and the first main signal is applied to one terminal of the second capacitor.

6. The power supply device of claim 1, wherein, if the first main signal is deactivated and the second main signal is activated, then the power supply device precharges the first boost node, boosts the voltage of the second boost node, and then applies the boosted voltage of the second boost node to the output node.

7. The power supply device of claim 1, wherein, if the first main signal is activated and the second main signal is deactivated, then the power supply device boosts the voltage of the first boost node, precharges the second boost node, and applies the boosted voltage of the first boost node to the output node.

8. The power supply device of claim 2, wherein, if the voltage of the output node falls below the preset reference voltage, the bulk voltage controller activates the bulk control signal to disconnect at least one of the first boost node and the second boost node from the bulk node.

9. The power supply device of claim 2, wherein, if the voltage of the output node is greater than the preset reference voltage, the bulk voltage controller deactivates the bulk control signal to connect at least one of the first boost node and the second boost node to the bulk node.

10. The power supply device of claim 1, wherein each of the first transmission unit and the second transmission unit comprises at least one PMOS transistor.

11. The power supply device of claim 1, wherein the output unit further comprises:
- a first precharge unit that initializes the voltage of the first boost node; and
- a second precharge unit that initializes the voltage of the second boost node.

12. The power supply device of claim 11, further comprising:
- a first controller that controls operation of the first precharge unit in response to a first auxiliary signal; and
- a second controller that controls operation of the second precharge unit in response to a second auxiliary signal, wherein a phase of the first auxiliary signal is opposite to a phase of the first main signal, and a phase of the second auxiliary signal is opposite to a phase of the second main signal.

13. The power supply device of claim 1, wherein the first main signal and the second main signal overlap each other only when the first main signal and the second main signal are both activated.

14. The power supply device of claim 1, wherein, if the bulk control signal is deactivated, the bulk voltage controller connects the bulk node to the output node according to the voltages of the first boost node and the second boost node.

15. A power supply device, comprising:
- a first boost circuit that boosts a voltage applied to a first boost node in response to a first main signal, and a first transmission unit having a first PMOS transistor receiving a first gate voltage that controls provision of the boosted voltage of the first boost node to an output node;
- a second boost circuit that boosts a voltage applied to a second boost node in response to a second main signal, and a second transmission unit having a second PMOS transistor receiving a second gate voltage that controls provision of the boosted voltage of the second boost node to the output node; and
- a bulk voltage controller, connected between the first boost node and the second boost node, that controls a connection between the output node and a bulk node in response to a bulk control signal,
- wherein voltages respectively applied to gates of the first and second PMOS transistors are determined in response to an output voltage at the output node, the first main signal, and the second main signal.

16. The power supply device of claim 15, further comprising:
- a comparator that compares a voltage apparent at the output node with a preset reference voltage and provides a comparison value;
- an auxiliary pump that provides a bulk voltage precharging the bulk control signal and the bulk node in response to the comparison value; and
- an auxiliary circuit including a bulk control signal booster that provides the bulk control signal in response to the comparison value.

17. The power supply device of claim 15, wherein one of the first gate voltage and the second gate voltage is equal to the voltage of the output node, and the other one of the first gate voltage and the second gate voltage is equal to a difference between the voltage of the output node and a power supply voltage.

18. The power supply device of claim 17, wherein if the first main signal is activated, then the first gate voltage is equal to the voltage of the output node and the second gate voltage is equal to the difference between the voltage of the output node and the power supply voltage, and if the second main signal is activated, then the second gate voltage is equal to the voltage of the output node and the first gate voltage is equal to the difference between the voltage of the output node and the power supply voltage.

19. The power supply device of claim 15, wherein, if the first main signal is deactivated and the second main signal is activated, the first boost node is precharged, a voltage at the second boost node is boosted, and then, the boosted voltage of the second boost node is applied to the output node,
- if the first main signal is activated and the second main signal is deactivated, the second boost node is precharged, a voltage at the first boost node is boosted, and then, the boosted voltage of the first boost node is applied to the output node.

20. A display apparatus, comprising:
- a controller that outputs a plurality of control signal; and
- a power supply device that applies a boosted voltage to a source driver or a gate driver in response to control signals output from the controller,
- wherein the power supply device comprises:
- a boost circuit unit that boosts voltages of a first boost node and a second boost node in response to a first main signal and a second main signal, respectively;
- an output unit including a first transmission unit and a second transmission unit that provides the boosted voltage via an output node, wherein the first transmission unit applies the voltage of the first boost node to the output node and the second transmission unit applies the voltage of the second boost node to the output node; and
- a bulk voltage controller, connected between the first boost node and the second boost node, that controls a connection between the output node and a bulk node in response to a bulk control signal,
- wherein first and second voltages respectively applied to gates of the first transmission unit and the second transmission unit are determined according to a voltage apparent at the output node, the first main signal and the second main signal.

* * * * *